Sept. 18, 1956 M. PIRNIE Re. 24,219

TREATMENT OF SEWAGE BY BIO-CHEMICAL ACTION

Original Filed April 23, 1949 2 Sheets-Sheet 1

INVENTOR
Malcolm Pirnie
BY Emery, Varney, Whittemore & Pitt.
ATTORNEY

Sept. 18, 1956 M. PIRNIE Re. 24,219

TREATMENT OF SEWAGE BY BIO-CHEMICAL ACTION

Original Filed April 23, 1949 2 Sheets-Sheet 2

INVENTOR
Malcolm Pirnie
BY Emery, Varney, Westmoreland & Dix
ATTORNEY

United States Patent Office

Re. 24,219
Reissued Sept. 18, 1956

24,219

TREATMENT OF SEWAGE BY BIO-CHEMICAL ACTION

Malcolm Pirnie, New York, N. Y., assignor to Research Corporation, New York, N. Y., a corporation of New York Original No. 2,676,919, dated April 27, 1954, Serial No. 89,272, April 23, 1949. Application for reissue April 25, 1956, Serial No. 580,690

16 Claims. (Cl. 210—2)

Figure 1:
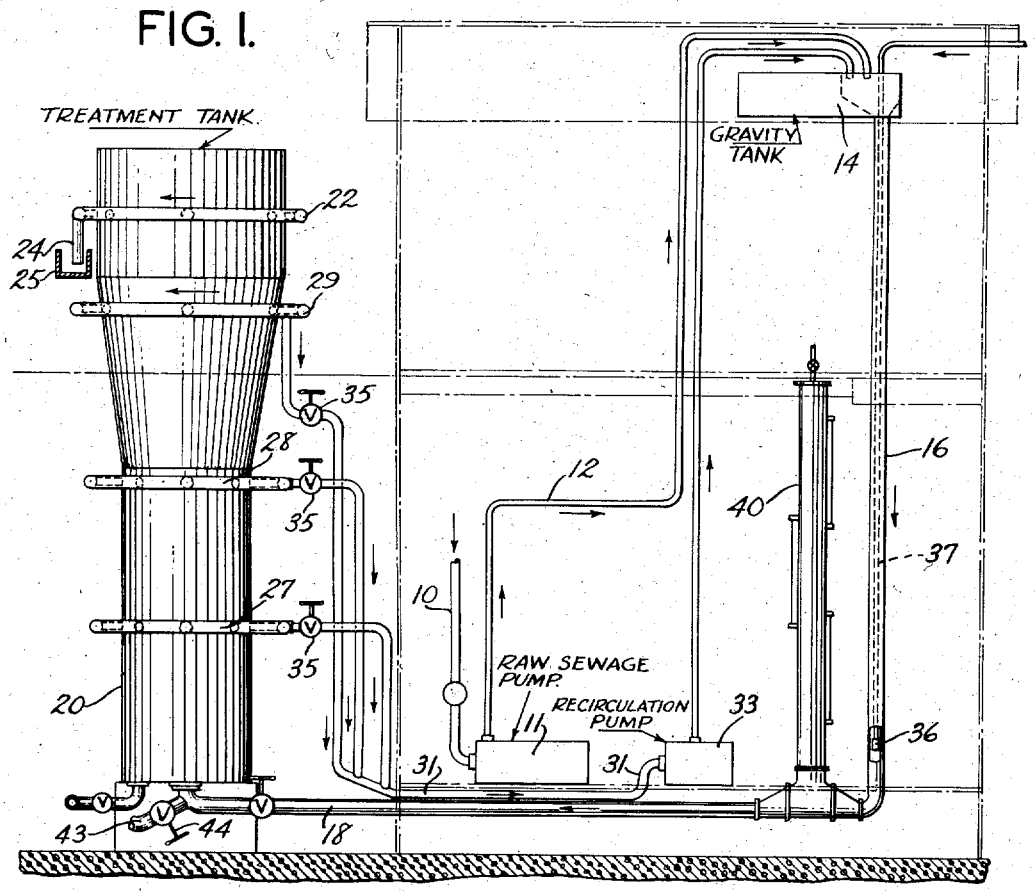

Matter enclosed in heavy brackets [ ] appears in the original patent but forms no part of this reissue specification; matter printed in italics indicates the additions made by reissue.

This invention relates to treatment of sewage and organic industrial waste by a bio-precipitation process in which the precipitation of colloidal and dissolved organic matter from the sewage or other waste is accomplished by preoxygenation of the sewage or waste followed by its upward flow through biological flocs suspended in a treatment tank.

It is an object of the invention to provide an improved method and apparatus for purifying sewage and organic industrial wastes by bio-precipitation. One feature of the invention relates to the preoxygenation of the sewage or waste by counterflow of the liquid and oxygen. This counterflow gives the most advantageous gradients for causing the liquid to absorb oxygen more rapidly and in larger quantities within the space available for preoxygenation and to attain higher concentration of oxygen before entry into the treatment tank.

Another feature relates to the recirculation of effluent in such a counterflow system so as to dilute the incoming liquid sufficiently to enable the liquid to absorb sufficient oxygen to supply the entire bio-chemical oxygen demand of the process.

Another object of the invention is to control the position of the biological floc which is kept in suspension in the treatment tank. With this invention the shape of the tank and the recirculation of material from different levels of the tank control the upward velocity of the liquid in the tank so as to prevent the biological floc from escaping with the effluent.

Other features of the invention relate to the manner in which the incoming liquid is distributed over the cross section of the treatment tank so as to obtain upward flow of the liquor in the treatment tank with a minimum of disturbance of the biological floc suspended in the tank. It is important to avoid the formation of any local currents of liquor rising through openings broken through the floc.

This invention will be described in connection with the treatment of sanitary sewage, but it will be understood that the influent liquid used with the invention may be organic industrial waste, instead of sanitary sewage, or may be a combination of the two.

Other objects, features and advantages of the invention will appear or be pointed out as the description proceeds.

In the drawing, forming a part hereof, in which like reference characters indicate corresponding parts in all the views.

Figure 3:
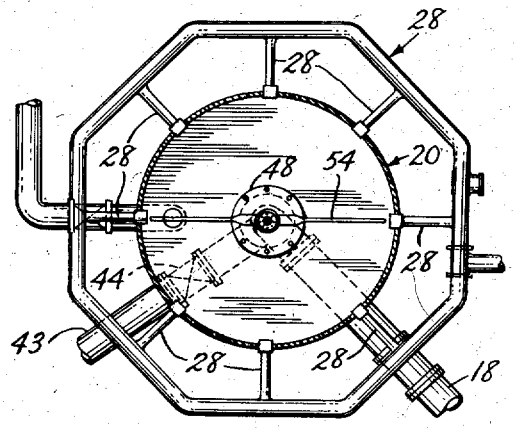
Figure 2:
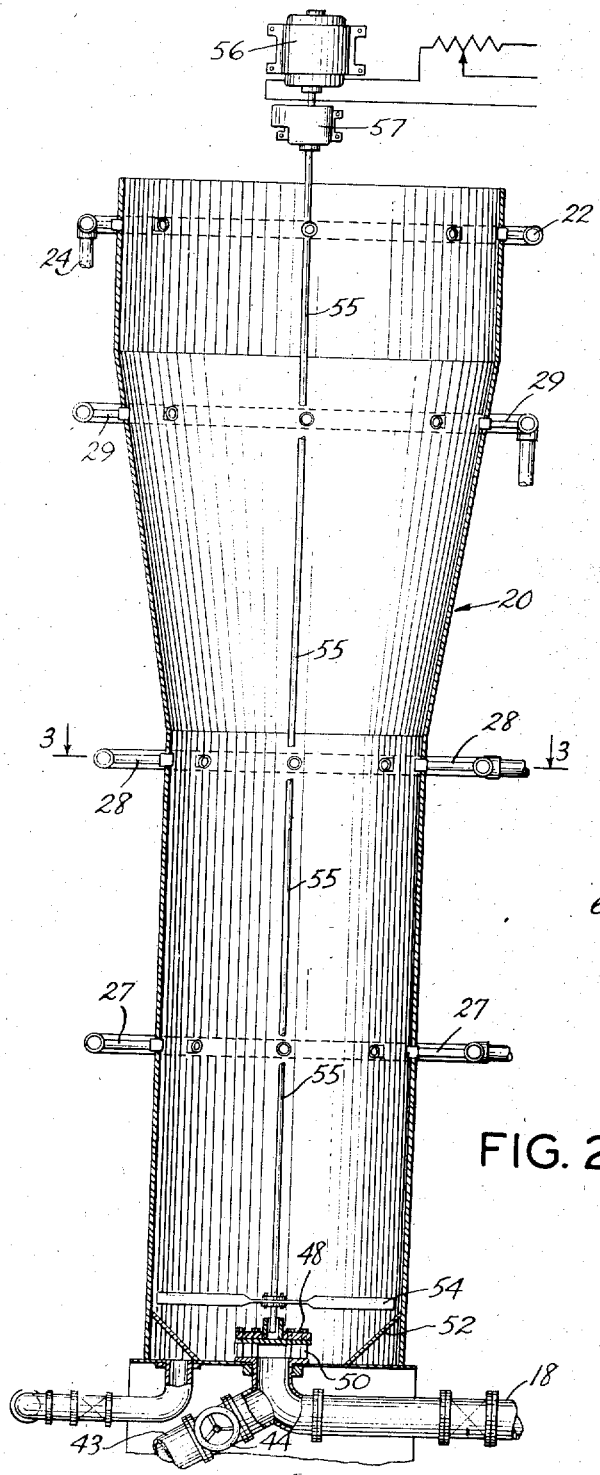
Figure 4:
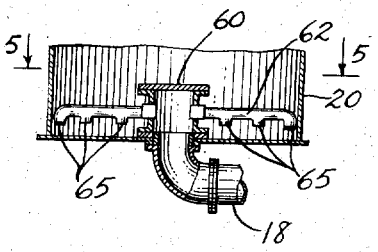

Figure 1 is a diagrammatic elevation of a sewage treatment plant embodying this invention, Figure 2 is a sectional view through the treatment tank shown in Figure 1, Figure 3 is a sectional view taken on the line 3—3 of Figure 2, Figure 4 is a vertical sectional view showing an alternative expedient for distributing influent liquid across the full cross section of the lower end of the treatment tank.

Figure 5:
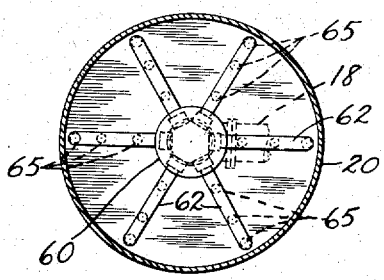

Figure 5 is a sectional view taken on the line 5—5 of Figure 4.

Incoming sewage to be treated is drawn through a pipe line 10 and discharged by a pumping unit 11, through piping 12, to a tank 14. The supply of sewage to the tank 14 can be by gravity, if the sewage supply line is at sufficient elevation. The sewage from the tank 14 flows by gravity downward through an oxygenation unit 16 which communicates at its lower end with an influent pipe 18. As will be seen from the drawings, the oxygenation unit is located within the downwardly extending run of the conduit which connects gravity tank 14 with influent pipe 18.

The influent pipe 18 opens into the lower end of a treatment tank 20; and the liquor in the tank 20 rises slowly, through a biological floc suspended in the tank, to the upper portion of the tank where the effluent overflows through conduits that lead to an effluent collector 22. These conduits are located at angularly spaced regions around the circumference of the tank in order to maintain an even flow of the liquid upward in the tank 20. The effluent collector 22 has a discharge pipe 24 leading downward into a drain 25.

There are intermediate collectors 27, 28 and 29 communicating with the interior of the tank 20, at angularly spaced regions around its circumference, at different levels of the tank. These collectors are connected by suitable piping with a common recirculation line 31 leading to a recirculation pump unit 33. The flow of liquor from the collectors 27, 28 and 29 to the common recirculation line 31 is controlled by valves 35 in the respective piping connections between the collectors and the recirculation line 31.

The recirculation pump unit 33 pumps liquor from the tank 20 into the tank 14, where it mixes with the sewage to be treated. This mixture flows into the upper end of the oxygenation unit 16. The amount of liquor drawn from the tank 20 through the collectors 27 and 28 controls the upward velocity of the liquor in the tank 20, this velocity being decreased by any increase in the amount of liquor drawn off through the collectors 27 and 28. The process can be carried on under certain conditions without the collectors 27 and 28.

The upper level of biological floc in the tank 20 is located between the collectors 28 and 29. Because of this, any liquor drawn off by the collector 29 will have a low bio-chemical oxygen demand and such liquor can therefore be effectively used for diluting the sewage passing downward through the oxygenation unit 16 so that the liquid stream in the oxygenation unit 16 is capable of absorbing sufficient oxygen to supply the full oxygen requirements of the process for treating the influent supplied to the lower end of the treatment tank 20. This is important because it is a feature of the invention that the oxygen for maintaining aerobic environmental conditions is supplied to the tank by using the liquid itself as the carrier for the oxygen with substantially all of the oxygen dissolved in the liquid.

The advantage of having the oxygen dissolved is partly to obtain more effective biological reaction, and more important to prevent disturbance of the biological floc in the tank which would be caused by upward passage of gas bubbles from the bottom of the tank as has been the case with earlier processes.

In the oxygenation unit 16 there is an oxygen diffuser 36; and this diffuser 36 is supplied with oxygen through a conduit 37 which in the construction shown extends downward from the top of the oxygenation unit 16. For systems with light loading, air can be used in place of oxygen, but the amount of sewage that can be purified in a plant of a given size is greatly increased by use of commercially pure oxygen.

The oxygen diffuser 36 may be a chamber with porous walls, such as a ceramic block; or it may be a nozzle head with small openings, or any other construction for introducing bubbles of gas into the liquid flowing past the diffuser 36. The diffuser is preferably located on the center line of the liquid conduit through the oxygenation unit so as to distribute the oxygen bubbles as uniformly as possible across the full cross section of the liquid stream. The bubbles should be large enough so that their tendency to rise in the conduit of the oxygenation unit is sufficient to enable them to move against the downward velocity of the liquid stream. The bubbles are not of uniform size in practice, and some of the smaller ones are carried by the liquid stream into the influent pipe 18.

Some of the oxygen in these smaller bubbles may be absorbed by the liquid as it travels further downward below the diffuser 36 and is subjected to an increase in the hydrostatic head; but others of the smaller bubbles rise in the influent pipe 18 and pass upward into an oxygen recovery dome 40 that communicates with the influent pipe 18 through the top wall of the pipe at a location between the oxygenation unit 16 and the treatment tank 20. The cross section of the influent pipe 18 increases in the region of the dome 40 so as to reduce the liquid velocity and facilitate the escape of oxygen bubbles into the dome 40. Oxygen recovered in the dome 40 can be returned to the oxygenation unit 36, if desired, or it may be used for oxygenation of sewage at other points in the treatment plant.

The diffuser 36 is preferably located some distance above the lower end of the oxygen unit so as to allow for absorption of small oxygen bubbles by the liquid passing downward from the diffuser 36. However, the diffuser 36 is preferably located more than half-way down in the oxygenation unit 16 so as to take advantage of a counterflow of the oxygen and incoming liquid. The advantage of this counterflow is an increase in the average oxygen pressure gradient for compelling absorption of oxygen by the liquid. There is nitrogen from the air dissolved in the liquid that comes from the pump unit 11. Because of the fact that there is little nitrogen present in bubbles of commercially pure oxygen, the pressure of the dissolved nitrogen causes some of that gas to pass into the oxygen bubbles and in this way nitrogen is removed from the liquid and the percentage of oxygen in the bubbles is reduced.

As the sewage passes downward through the oxygenation unit 16 and its oxygen concentration is increased it comes in contact with oxygen bubbles containing a higher percentage of pure oxygen until at the diffuser, the sewage comes in contact with bubbles of commercially pure oxygen and attains practically its saturation value with respect to that atmosphere. Thus the sewage supplied to the lower end of the treatment tank is substantially saturated with oxygen.

For periodically removing accumulated solid material from the tank 20 when the amount of floc in the tank becomes excessive, there is an outlet pipe 43 commanded by a valve 44. If desired, the operation of the tank may be discontinued for a short period of time to permit a settling and concentration of the solid material in the bottom of the tank prior to withdrawal.

Figure 2 shows the treatment tank 20 on an enlarged scale. This figure, together with Figure 3, shows the way in which the conduits of the collector 28 open through the walls of the tank at angularly spaced locations around the circumference of the tank. The collector 27 is similar in construction to the collector 28. The collector 29 is also similar except for its larger size which is made necessary by the fact that the tank increases in diameter progressively between the collector 28 and the collector 29. The effluent collector 22 shown in the drawing is the same as the collector 29, but one or more overflow wiers can be used in place of the collector 22.

There is a baffle 48 located immediately above the opening through which the influent pipe communicates with the bottom of the tank 20. This baffle, which is held at a fixed level above the inlet by bolts 50, diverts the stream of influent sideways in all directions so that it spreads across the bottom of the tank. In order to avoid possible dead pockets in the lower portions of the tank, there is an inclined annular deflector 52 in position to direct the flow of liquor upward.

The distribution and flow of the incoming liquid, to make it as nearly uniform as possible across the full cross section of the tank, is promoted also by a stirrer 54 that has blades extending outwardly from a hub which is secured to a drive shaft 55. The drive shaft 55 has a bearing at its lower end carried by the baffle 48, and the upper end of the drive shaft 55 is rotated by a motor 56 through reduction gearing 57.

When the slowly rising liquor in the tank 20 has passed upward beyond the collector 28, its upward velocity decreases progressively because of the increase of cross section of the tank between the collectors 28 and 29. This decrease in velocity reduces the ability of the liquid to move the floc upward in the tank, and the velocity of the liquor is preferably regulated so that the top of floc mass remains suspended in the diverging portion of the tank between the collectors 28 and 29. If the upward velocity of the liquor in the tank is too great, it can be reduced by drawing off some of the liquor, with its complement of solid matter, through the collectors 27 and 28.

It is a feature of the invention that the floc is kept in suspension with little turbulence by the upward flow of the liquor being treated, and there is substantially no agitation of the floc mass in the treatment tank. The mild stirring at the lower end of the tank is merely for the purpose of distributing the incoming liquid over the cross section of the tank and preventing the formation of any localizing convection currents in the liquor in the tank. The rate of stirring is always kept below that value which will cause the floc to rise to the top of the tank.

Figures 4 and 5 show a modified construction for distributing the incoming liquid across the lower portion of the tank 20. In this modified construction there is a housing 60 located immediately above the tank inlet; and there are outwardly extending pipes 62 angularly spaced around the circumference of the housing 60, and preferably extending radially from the housing. These pipes 62 extend close to the side of the tank 20, and they preferably have a number of outlets 65 from which liquid is introduced into the tank at a large number of spaced locations across the bottom of the tank. These openings 65 are preferably directed downwardly so as to avoid the setting up of currents in the liquor above them. The object is to have the full cross section of the liquor move upwardly as uniformly as possible. The pipe distributing system for incoming liquid, as shown in Figures 4 and 5, may be used with or without the stirrer 54. If desired the outlets 65 from the pipes 62 may extend in directions that give the liquid a spiral flow. With the outlets 65 disposed in such directions the outlets of the collectors 27, 28 and 29 are preferably disposed in directions tangential to the circumference of the tank.

The preferred embodiment of the invention has been illustrated and described, but terms of orientation are in most instances relative; and changes and modifications can be made, and some features of the invention can be used alone or in different combinations without departing from the invention as defined in the claims.

I claim as my invention:

1. Apparatus for treating sewage or other liquid containing organic waste material, said apparatus comprising a treating tank to which a steady stream of liquid and dissolved oxygen is supplied for gradual upward flow in said tank, an influent pipe opening into the lower end of the tank, an oxygenation unit connected to the upstream end of the influent pipe, said oxygenation unit having a passage that conducts liquid to the tank from an original supply source outside of the tank, said passage having a downwardly extending run for the flow of a solid stream of the liquid toward the influent pipe, an oxygen diffuser located in the lower portion of the downwardly extending run, and apparatus for causing flow of oxygen through the diffuser into the liquid stream in bubbles, the oxygen-discharge openings in the diffuser being correlated with the liquid velocity and pressure, and being large enough to produce bubbles most of which are of sufficient size to having a buoyancy that overcomes the downward velocity of the liquid toward the diffuser.

2. Apparatus for treating liquids containing organic waste material, including, in combination, a treatment tank in which the liquid is subjected to a biochemical treatment by passage through a biological floc suspended in the tank, said tank having an inlet at its lower end a discharge at its upper end, an influent pipe connected at its downstream end to said inlet, and a collector intermediate the upper and lower ends of the tank and through which liquid from the tank is withdrawn, an oxygenation unit connected to the upstream end of the influent pipe and having a downwardly extending run through which a solid stream of liquid to be treated passes on its way to the influent pipe, an oxygen diffuser located in the oxygenation unit at a low level in said downwardly extending run of said unit so that rising bubbles of oxygen flow in a direction counter to the movement of liquid through the oxygenation unit, piping leading from the collector to the upper end of the oxygenation unit, and piping through which liquid to be treated is also supplied from an original supply source outside of the tank, to the upper end of the oxygenation unit simultaneously with the liquid from the collector.

3. Apparatus for treating liquid containing waste solids, said apparatus including a treating tank in which the liquid is subjected to a biochemical treatment by passage through a biological floc suspended in the tank, said tank having an inlet at its lower end, an influent pipe connected at its downstream end to said inlet, an oxygenation unit outside of the treating tank with an inlet at the top for entrance of said liquid, the oxygenation unit being connected to the upstream end of the influent pipe and having a downwardly extending passage through which a solid stream of liquid to be treated passes on its way to the influent pipe, means for passing the liquid through the oxygenation unit and thence through the tank inlet at a controlled rate which is correlated with the cross section of the tank to obtain a low velocity of upflow through the tank, said means including a piping connection through which liquid from an original supply source outside of the tank is supplied to the upstream end of the oxygenation unit, an oxygen diffuser located in the lower portion of the oxygenation unit and located in position to cause a flow of oxygen into the liquid stream counter to the direction of the liquid flow toward the tank, and means from which clear effluent liquor flows from the upper portion of the tank.

4. Sewage treating apparatus comprising a treating tank in which the liquid is subjected to a biochemical treatment by passage through a biological floc suspended in the tank, said tank having an inlet at its lower end, an influent pipe through which liquid is supplied to said inlet, an oxygenation unit including a downwardly extending conduit through which liquid to be treated flows to the influent pipe, a sewage supply pipe, a pump that delivers liquid from the sewage supply pipe to the upper end of the conduit through the oxygenation unit, collector passages at spaced regions around the circumference of the tank at an intermediate level between the upper and lower ends of the treatment tank for the withdrawal of liquid from the tank, a recirculation pump that delivers the liquid from the collector to the upper end of said conduit through the oxygenation unit, an oxygen diffuser located in the lower half of the conduit through the oxygenation unit, valve means commanding the flow of liquid through the respective connections from the collectors to the recirculation pump, a section along the influent pipe, between the oxygenation unit and the treating tank of enlarged cross section, and an oxygen recovery collector located above the influent pipe and communicating with the influent pipe at said region of increased cross section.

5. Apparatus for obtaining bio-precipitation of organic waste materials by passage of liquid containing such materials through a biological floc kept in suspension within a tank, said apparatus comprising a treating tank, oxygenating apparatus through which the liquid passes outside of the tank, said apparatus having a liquid inlet at the top and an oxygen diffuser located adjacent the bottom thereof, a conduit connecting a discharge outlet of the oxygenation unit with an inlet to the tank at the bottom of the tank, a piping connection to said inlet through which the original liquid containing the waste material is supplied from a source outside of the tank, circulating means that supplies the liquid to the tank for upward flow at a low rate which leaves the floc undisturbed, upwardly diverging side walls of the tank that produce a progressive increase in cross section throughout the vertical zone of the tank at which the top of the biological floc is intended to be suspended, and means that control the upward velocity of the liquid in the tank.

6. In the method of treating sewage and other liquid containing waste organic material by passing the liquid at low velocity through a floc blanket suspended within a treating tank and after preoxygenation of the liquid to the full biochemical oxygen demand of the organic matter before introducing the liquid into the treating tank, the improvement which comprises producing a quiet solution of oxygen in the liquid for upward passage through the suspended floc blanket by passing a stream of liquid downwardly through an approach conduit ahead of the tank and at the same time introducing a stream of oxygen into the liquid near the lower end of the downwardly moving stream and in sufficient volume to produce bubbles of oxygen that rise against the downwardly moving liquid stream to produce counterflow of liquid and gas with resulting dissolving of oxygen in the liquid stream, removing free bubbles of oxygen that remain in the liquid stream at a region downstream from the location where the oxygen is introduced into the stream, and then introducing the quiet solution of oxygen and liquid into the treating tank under the floc blanket.

7. In the treating of sewage and other liquid containing waste organic material as described in claim 6, the method characterized by the additional step of withdrawing liquor from the tank and supplying it to the stream of incoming liquid ahead of the region of oxygenation so as to dilute the incoming stream and reduce its strength and biochemical oxygen demand to such value that the oxygen required for the process can all be absorbed by the diluted liquid on its way to a zone of treatment.

8. The method of treating liquid-borne sewage containing colloidal organic solids, which method comprises passing the liquid downwardly in a confined stream, introducing bubbles of commercially pure oxygen into the downwardly flowing liquid stream near its lower end so as to obtain counterflow of the oxygen and liquid and dissolving of the oxygen in the liquid, thereafter passing the preoxygenated liquid, with the liquid substantially free of bubbles, into the lower end of a treating zone containing a body of liquid with a biological floc mass suspended in the body of liquid intermediate of the top and bottom thereof, passing the preoxygenated liquid upwardly through the biological floc mass quietly and with substantially no agitation of the floc mass and with the movement of liquid in the treating zone sufficient to maintain the floc mass suspended, but limited to a velocity of the liquid low enough to prevent lifting of the floc mass to the top of the body of liquid in which it is suspended in the treating zone.

9. In the treatment of sewage by maintaining aerobic environmental conditions in a liquid-suspended biological floc mass in a treating zone through which liquid-borne preoxygenated sewage is passed, the improvement that comprises dissolving in the liquid of the sewage sufficient oxygen for the oxygen requirement of the process, and passing the preoxygenated liquid upward through the treating zone and through a biological floc mass in the treating zone quietly and with substantially no agitation of the floc mass and with the transverse cross section of the stream increasing and the velocity of the liquid becoming correspondingly less as it moves upward through the treating zone, the velocity below the treating zone being sufficient to move the biological floc mass upward and the velocity of the rising liquid above the treating zone being insufficient to lift the biological floc mass out of the treating zone and to the top of the body of liquid in which the floc mass is suspended.

10. In the bio-precipitation treatment of sewage and organic industrial wastes by supplying to a treatment zone liquid that has been preoxygenated by dissolving in the liquid oxygen sufficient for the biochemical demand of the process, the improvement which comprises obtaining a high oxygen concentration by dissolving oxygen in the liquid prior to the introduction of the liquid into the treating zone, said high oxygen concentration being obtained by subjecting a flowing stream of the liquid to contact with bubbles of progressively higher concentration of oxygen, as the liquid advances on its way to the treating zone, and removing buoyant bubbles of oxygen from the liquid downstream from the location at which the liquid is subjected to the bubbles of highest oxygen concentration.

*11. Apparatus for treating sewage or other liquid containing organic waste material, said apparatus comprising a treating tank to which a steady stream of liquid and dissolved oxygen is supplied for gradual upward flow in said tank, an influent pipe opening into the lower end of the tank, an oxygenation unit connected to the upstream end of the influent pipe, said oxygenation unit having a passage that conducts a diluent liquid to the influent pipe, said passage having a downwardly extending run for the flow of a solid stream of the diluent liquid toward the influent pipe, an oxygen diffuser located in the lower portion of the downwardly extending run, apparatus for causing flow of oxygen through the diffuser into the liquid stream in bubbles, the oxygen-discharge openings in the diffuser being correlated with the liquid velocity and pressure, and being large enough to produce bubbles most of which are of sufficient size to have a buoyance that compensates the downward velocity of the liquid toward the diffuser, and another pipe through which liquid to be treated is supplied to the diluent for dilution thereby and movement upwardly therewith in said tank.*

*12. Apparatus for treating liquid containing organic waste material, including in combination a treatment tank in which the liquid is subjected to a biochemical treatment by passage through a biological floc suspended in the tank, said tank having an inlet at its lower end, a discharge at its upper end, and said apparatus including a liquid flow conduit system leading to the lower part of the tank, said conduit system comprising an influent pipe connected at its downstream end to said inlet, and a collector at a predetermined level of the biological floc in the tank and through which liquid from the tank is withdrawn, an oxygenation unit connected to the upstream end of the influent pipe and having a downwardly extending run through which a solid stream of liquid from the tank passes on its way to the influent pipe, an oxygen diffuser located in the oxygenation unit at a low level in said downwardly extending run of said unit so that any rising bubbles of oxygen in the oxygenation unit flow in a direction counter to the movement of liquid through the oxygenation unit, the conduit system comprising also piping leading from the collector to the upper end of the oxygenation unit, and piping through which liquid to be treated is supplied, from an original source outside of the tank, to the liquid from the tank for dilution thereby and movement upwardly therewith into the biological floc.*

*13. In the method of treating sewage and other liquid containing waste organic material by passing the liquid at low velocity through a floc blanket suspended within a treating tank and in which new liquid to be treated is diluted with liquor withdrawn from said tank at a level where the liquor is at least partly treated the improvement which comprises producing a quiet solution of oxygen in the liquor withdrawn from the tank for subsequent upward passage through the suspended floc blanket by withdrawing liquor from a region of the treating tank at which the liquor has been at least partially treated, passing a stream of the withdrawn liquor downwardly through an approach conduit ahead of the tank and at the same time introducing a stream of oxygen into the liquor near the lower end of the downwardly moving stream, and in sufficient volume to produce some bubbles of oxygen that rise against the downwardly moving liquor stream to produce counter flow of liquor and gas with resulting dissolving of oxygen in the liquor stream, then introducing the solution of dissolved oxygen and liquor into the treating tank under the floc blanket, and by said liquor diluting new liquid to be treated whereby the oxygen dissolved in the liquor supplies part of the biochemical oxygen demand of the liquid during the upward passage of the liquid through the biochemical floc.*

*14. In the bio-precipitation treatment of sewage and organic industrial wastes by supplying to a treatment zone liquid that has been pre-oxygenated by dissolving in the liquid oxygen sufficient for the biochemical demand of the process, the improvement which comprises withdrawing from a region of the treating zone liquid that has been at least partially treated, obtaining a high oxygen concentration by dissolving oxygen in the liquid prior to the return of the liquid into the treating zone, said high oxygen concentration being obtained by subjecting a flowing stream of the liquid to contact with bubbles of progressively higher concentration of oxygen as the liquid advances on its way during return to the treating zone, introducing the material to be treated into one end of the treatment zone, and returning the withdrawn liquid to the treatment zone at the same end as the material to be treated and as a diluent for said material whereby oxygen dissolved in said withdrawn liquid supplies at least part of the biochemical oxygen demand of the material to be treated.*

*15. Apparatus for treating sewage or other liquid containing organic waste material by gradual and quiet upward flow of the liquid, with oxygen dissolved therein for the oxygen demand of the process, through a suspended biological floc, the apparatus comprising a tank in which the biological floc is suspended in liquid which is being treated and within a zone below the top of the tank, whereby effluent above the floc can be removed from the tank, a passage and distributing means through which sewage or other liquid to be treated is introduced into the bottom of the tank and distributed substantially uniformly therein under the floc, means for supplying oxygen to the liquid to be treated including an oxygenator located outside of the tank and with a downwardly extending run for liquid and an oxygen distributor near the bottom of said run and in position to discharge bubbles of oxygen into the liquid whereby any bubbles that rise by their buoyance move*

*counter to the direction of the downward flow of liquid through said oxygenator, an outlet above the bottom of the tank for removal of at least partially treated liquid from the tank, means for supplying a solid stream of liquid to the upper end of the oxygenator for downward flow therein, said means including a passage through which liquid from said outlet flows from the tank to the oxygenation unit, and another passage from which sewage or other liquid containing organic waste is mixed with the liquid from said outlet for dilution thereby and for addition of some of the oxygen dissolved therein to the new liquid to be treated.*

*16. In the method of treating sewage or other liquid containing waste organic material by passing the liquid upwardly at low velocity through a biological floc suspended in a tank in a treating zone in a mass of liquid to be treated and at a level below the top of the mass of liquid whereby substantially clear effluent is withdrawn from the mass of liquid above the floc, and in which method the oxygen for the treatment is dissolved in the liquid to form a quiet solution that moves upwardly at low velocity through said floc, the improvement which comprises withdrawing liquid from the tank at a level where the liquid has been at least partially treated and has a lower oxygen demand than the liquid as originally supplied to the tank, passing the withdrawn liquid from the tank to an oxygenating region in which the withdrawn liquid is flowed downwardly in a solid stream toward a location*

*at which oxygen is discharged in bubbles into the solid stream for absorption by the withdrawn liquid and with counterflow of the liquid and any undissolved bubbles of gas which rise by buoyancy in the downwardly flowing stream, passing the withdrawn liquid, after its passage through the oxygenation unit, back to a lower level of the tank and with substantially all of the oxygen in the withdrawn liquid dissolved therein to eliminate bubbles in the treating zone, and diluting a new supply of liquid to be treated by mixing it with the withdrawn liquid to provide at least a part of the oxygen demand of the liquid to be treated by quiet transfer in solution to the liquid to be treated to the organic material therein.*

References Cited in the file of this patent or the original patent

UNITED STATES PATENTS

| | | |
|---|---|---|
| 1,394,698 | Trent | Oct. 25, 1921 |
| 2,380,465 | Proudman | July 31, 1945 |
| 2,468,865 | Compobasso et al. | May 3, 1949 |
| 2,559,462 | Pirnie | July 3, 1951 |

FOREIGN PATENTS

| | | |
|---|---|---|
| 14,733 | Great Britain | of 1915 |
| 259,385 | Great Britain | of 1926 |

OTHER REFERENCES

Sewage Works Journal, May 1948, pp. 516–524.